May 12, 1931.  O. Q. HINDS  1,804,615

FOOT CONTROLLED ACCELERATOR AND BRAKE MECHANISM

Filed May 27, 1927

Inventor
Orville Q. Hinds.
George E. Mueller Atty.

Patented May 12, 1931

1,804,615

UNITED STATES PATENT OFFICE

ORVILLE Q. HINDS, OF CHICAGO, ILLINOIS

FOOT CONTROLLED ACCELERATOR AND BRAKE MECHANISM

Application filed May 27, 1927. Serial No. 194,556.

My invention relates to vehicle controlling devices, and has for one of its objects, the provision of an improved controlling mechanism.

Another object is to provide means whereby an automobile may be accelerated and braking action applied by the same foot substantially simultaneously.

One embodiment of the invention is illustrated in the accompanying drawings, wherein—

Figure 1:
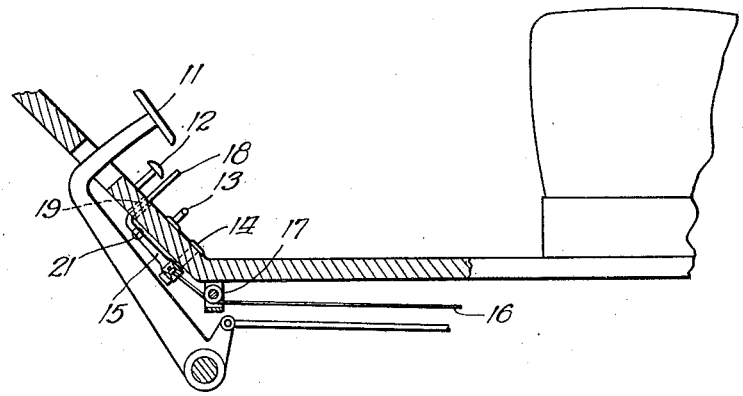
Figure 2:
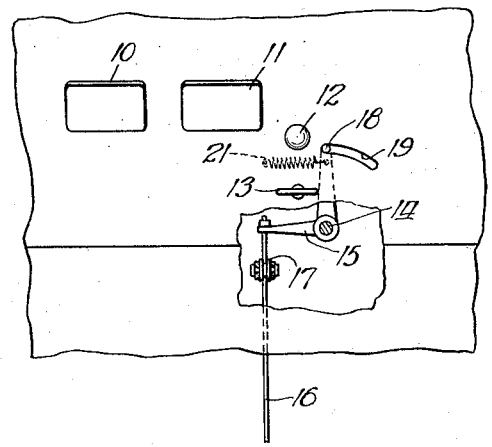

Fig. 1 is a vertical sectional view through the floor boards of an automobile, showing my invention applied thereto, and Fig. 2 is a plan view thereof, the floor boards being partially broken away air brake mechanism being indicated schematically.

My invention presupposes the equipment of a motor vehicle with some form of fluid brake mechanism, wherein the breaking pressure is effected by automatic means and the controlling pedal operates a valve to open or close a pressure line.

By fluid pressure is meant any of the usual systems wherein a fluid is confined within an enclosed space and operates a piston to tighten a brake band or the like. This might include brake mechanism operated by a hydraulic fluid such as glycerine or a brake controlled by air pressure. It is the latter type which I have particularly in mind, and wherein a pressure tank is provided, equipped with means for automatically maintaining the air pressure therein at a predetermined value.

Referring to the drawings, a vehicle is provided with the usual clutch mechanism, operated by a clutch pedal 10. A foot brake of the usual kind now used on automobiles may be provided, and if so is operated by a foot pedal 11.

At the right of the clutch and brake foot pedals, the usual accelerator pedal 12 projects above the floor board, and is pressed downwardly against the action of a spring (not shown) to regulate the flow of vaporized gasoline from the carburetor to the motor. A foot rest 13, of any usual form is provided adjacent the accelerator pedal.

Secured in the floor board, is a stud shaft 14, on the projecting end of which a bell crank lever 15, is rotatably secured. One arm of the bell crank has secured thereto a rod or cable 16, leading to a brake controlling valve (not shown) and the cable is guided by a sheave 17. The other arm of the bell crank has an upstanding projection 18, extending through an arcuate slot 19 in the floor board, adapted to be engaged by a driver's foot. A spring 21 having one end secured to the bell crank arm and the other end to the floor board, tends to turn the bell crank in a counter-clockwise direction, thus returning it automatically to unactuated position.

It will be seen that the projection 18 of the bell crank can be engaged with the foot which is operating the accelerator lever, without raising the foot either from the pedal or foot rest. Indeed, both the accelerator pedal and the brake pedal can be operated simultaneously by the same foot. There is no loss of time such as results when the present usual full mechanical brake is operated, and which makes it necessary to release the accelerator pedal, raise the foot a total of about six or eight inches, and finally depress the brake pedal several inches before the brake takes effect.

Instead of securing the stud shaft 14 and spring 21 to the floor board, it is obvious they may be fastened to other portions of the vehicle. This might be more desirable in certain cases, as then the floor boards would be more readily removable.

The invention is of particular utility when driving in conjested districts, or in districts where there are relatively steep grades and it becomes necessary to start or stop thereon.

What I claim as new and desire to secure by United States Letters Patent is:

1. In a motor driven vehicle provided with fluid brake mechanism, an accelerator pedal adapted to be depressed, and a mechanism for controlling the fluid brake, said mechanism comprising a bell crank with a connection to the fluid brake on one arm thereof, and a foot engaging projection on the other arm thereof, the projection extending through the floor board adjacent the accelerator pedal, and being movable sidewise by the foot, without releasing control of said accelerator pedal.

2. In a motor driven vehicle provided with fluid brake mechanism and having the usual floor boards, an accelerator pedal adapted to be depressed, a foot rest below the accelerator pedal in a position to support the foot with the heel on the floor board when engaging the accelerator pedal, and a fluid brake operating mechanism including a bell crank pivoted below the floor boards with one arm connected to a fluid controlling valve and the other arm having an upturned portion projecting up from below the floor boards at a position adjacent to and at the side of the accelerator pedal, the dimensions being so controlled that the two pedals may be operated singly or in unison without removing the foot from the foot rest and while retaining the heel on the floor boards in a position to rest the foot.

In witness whereof, I hereunto subscribe my name this 1st day of March, 1927.

ORVILLE Q. HINDS.